United States Patent Office 3,470,167
Patented Sept. 30, 1969

3,470,167
TRIAZOLYL STYRYL OPTICAL WHITENING AGENTS
Asim Kumar Sarkar, Leeds, England, assignor to Hickson & Welch Limited, Castleford, Yorkshire, England, a British company
No Drawing. Filed Sept. 7, 1966, Ser. No. 577,593
Claims priority, application Great Britain, Sept. 22, 1965, 40,404/65
Int. Cl. C09b 23/14; C07d 55/02
U.S. Cl. 260—240.9        9 Claims

---

ABSTRACT OF THE DISCLOSURE

An optical whitening agent of the formula

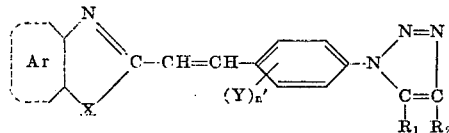

where Ar represents aryl; X is oxygen, sulphur or a group —NR— wherein R is hydrogen or a substituted or unsubstituted alkyl group of 1–4 carbon atoms; $R_1$ and $R_2$, which may be the same or different, are each hydrogen, a substituted or unsubstituted alkyl group of 1–4 carbon atoms, carboxy, hydroxy or alkoxy-carbonyl of 2–5 carbon atoms; Y is a halogen atom, cyano or an alkyl or alkoxy group of 1–4 atoms; and $n'$ is 0 or an integer from 1 to 4.

---

This invention is concerned with new chemical compounds of use as optical whitening agents especially for the whitening and/or brightening of cellulosic, polyamide, polypeptide and polyacrylic fibres.

Optical whitening agents have in recent years found extensive use in the treatment of textile fibres, both in their preparation and during washing, and are designed in general to counteract the yellow or off-white colour which white textiles may develop. Such optical whitening agents also tend to improve coloured textiles as they impart a general brightness to them.

The present invention is based upon the discovery of new triazole compounds having optical whitening properties which have good substantivity to a wide variety of textile materials including cellulosic (e.g. cotton), polyamide (e.g. nylon), polypeptide and polyacrylic fibres, and which in addition have the advantage of being stable to hypochlorite and chlorine containing bleaches in the dilutions commonly encountered during conventional bleaching and washing operations.

According to the present invention, there are provided new compounds of the general formula

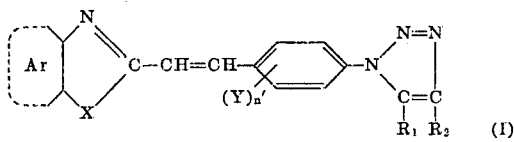

in which:
Ar represents the residue of an aromatic carbocyclic ring system which may for example be derived from benzene or naphthalene and may if desired be substituted by one or more substituents such as for example halogen (e.g. chlorine) atoms or alkyl, alkoxy or cyano groups;
X represents an oxygen or sulphur atom; or a group of formula —NR— (wherein R represents a hydrogen atom or an alkyl group either unsubstituted or substituted e.g. by a halogen atom or by a hydroxy, alkoxy, cyano, carboxy or alkoxycarbonyl group;

$R_1$ and $R_2$, which may be the same or different, each represents a hydrogen atom, an alkyl group (either unsubstituted or substituted e.g. by a hydroxy or acyloxy group) or a carboxy or alkoxycarbonyl group, one of $R_1$ and $R_2$ also if desired representing a hydroxy group;
Y represents a halogen (e.g. chlorine) atom or an alkyl, alkoxy or cyano group; and
$n'$ is 0 or an integer from 1 to 4, preferably 1 or 2.
The group

can for example be a group of formula

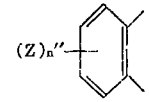

in which Z represents a halogen atom or an alkyl, alkoxy or cyano group and $n''$ is 0 or an integer from 1 to 4, preferably 1 or 2.

In particularly preferred compounds according to the invention, at least one of $R_1$ and $R_2$ represents hydrogen or a lower alkyl group containing from 1 to 4 carbon atoms, e.g. a methyl group, either unsubstituted or substituted by a hydroxy group or an acyloxy e.g. acetoxy group. In other preferred compounds of Formula I one of the groups $R_1$ and $R_2$ represents a carboxy or alkoxycarbonyl group containing from 2 to 5 carbon atoms e.g. an ethoxycarbonyl group. Where Y and/or Z (if present) represent alkyl or alkoxy groups, such groups are advantageously groups containing from 1 to 4 carbon atoms e.g. methyl groups. Where R represents an alkyl group (either unsubstituted or substituted), the said alkyl group preferably contains from 1 to 4 carbon atoms. Any halogen atoms in the compounds according to the invention are preferably chlorine atoms.

The following compounds according to the invention are particularly preferred having regard to their especially favourable properties as optical whitening agents:

2-[4'-(4''-hydroxymethyl-1'':2'':3''-triazol-1''-yl) styryl]-5-methyl-benzimidazole;
2-[2'-chloro-4'-(4''-hydroxymethyl-1'':2'':3''-triazol-1''-yl)styryl]-5-methyl-benzimidazole;
2-[2'-chloro-4'-(4''-hydroxymethyl-1'':2'':3''-triazol-1''-yl)styryl]-5-methyl-benzoxazole;
2-[2'-chloro-4'-(4''-hydroxymethyl-1'':2'':3''-triazol-1''-yl)styryl]-benzimidazole;
2-[4'-(4''-carboxy-5''-methyl-1'':2'':3''-triazol-1''-yl) styryl]-5-methyl-benzimidazole;
2-[4'-(4''-carboxy-5''-methyl-1'':2'':3''-triazol-1''-yl) styryl]-5-methoxy-benzoxazole;
2-[4'-(4''-carboxy-5''-methyl-1'':2'':3''-triazol-1''-yl) styryl]-5,6-dimethyl-benzimidazole;
2-[2'-chloro-4'-(4''-acetoxymethyl-1'':2'':3''-triazol-1''-yl)styryl]-5-methyl-benzimidazole;
2-[4'-(4''-(β-hydroxyethyl)-5''-hydroxy-1'':2'':3''-triazol-1''-yl)styryl]-5-methyl-benzimidazole;
2-[4'-(4''-(α-hydroxy-s-butyl)-1'':2'':3''-triazol-1''-yl) styryl]-5-methyl-benzimidazole;
2-[2'-chloro-4'-(4''-(β-hydroxyethyl)-5''-hydroxy-1'':2'': 3''-triazol-1''-yl)styryl]-5-methyl-benzoxazole;
2-[2'-chloro-4'-(4''-hydroxymethyl-1'':2'':3''-triazol-1''-yl)styryl]-5,6-dimethyl-benzimidazole; and
1-(β-hydroxyethyl)-2-[2'-chloro-4'-(4''-hydroxymethyl-1'':2'':3''-triazol-1''-yl)styryl]-benzimidazole.

The compounds according to the invention in general have favourable fluorescent properties. The hue of the fluorescence varies according to the nature of the substituents in the aromatic rings contained in the molecule.

Some of the compounds according to the present invention have the advantage of being non-ionic. Such compounds are thus stable in cationic aqueous solution.

For the purpose of treating textile materials in general, the compounds according to the invention may advantageously be incorporated into compositions comprising at least one compound according to the invention together with a solid or liquid carrier. Such compositions may for example be adapted for use in the washing of finished cellulosic, polyamide, polypeptide and polyacrylic fibres, and can take the form of aqueous solutions or suspensions of the compounds according to the invention. Such compositions may also conveniently contain hypochlorite and/or surface active agents. Compounds according to the invention which have relatively poor solubility in water can if desired conveniently be formulated as solutions in appropriate solvents other than water, such formulations being suitable for addition to aqueous baths. Where the compositions include a solid carrier, this may for example comprise a solid synthetic detergent or soap.

The compounds according to the present invention which are non-ionic may be incorporated into aqueous solutions which are cationic and which contain for example cationic softening agents.

The compounds according to the invention can be used in the preparation of synthetic fibres. Thus, for example, they may be incorporated in compositions from which synthetic fibres are prepared.

The compounds according to the invention may be prepared by any convenient method, but are advantageously prepared by processes which provide further features of the present invention and which are as follows:

(1) Reaction of a compound of the formula

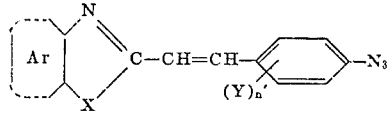

(wherein Ar, X, Y and $n'$ are as hereinbefore defined) with an ester of acetoacetic acid, preferably ethyl acetoacetate, to form a compound of formula

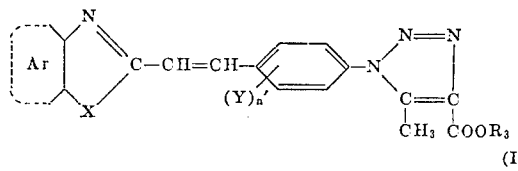

wherein $R_3$ represents an alkyl group. Where ethyl acetoacetate is used for the reaction, then $R_3$ represents an ethyl group. The reaction is preferably effected at elevated temperatures, advantageously at the reflux temperature of the reaction medium. The acetoacetic acid ester is conveniently used as its sodio derivative, the reaction being carried out in the presence of sodium and ethanol.

(2) Compounds of Formula I wherein at least one of $R_1$ and $R_2$ represents a carboxy group can be prepared by hydrolysing a compound of Formula I in which at least one of $R_1$ and $R_2$ represents an alkoxycarbonyl group. The compounds of Formula III (as hereinbefore defined) obtained by the process described above can thus be converted to compounds of Formula I wherein $R_1$ represents a methyl group and $R_2$ represents a free carboxy group by hydrolysis e.g. with an alcoholic alkali metal hydroxide such as alcoholic caustic soda.

(3) Compounds of Formula I wherein $R_1$ and/or $R_2$ represents a carboxy group (e.g. compounds of Formula I wherein $R_1$ represents a methyl group and $R_2$ represents a carboxy group prepared as described above) can be decarboxylated to form corresponding compounds in which $R_1$ and/or $R_2$ represents hydrogen, e.g. by the action of heat.

(4) Reaction of a compound of Formula II (as defined above) with an appropriate acetylenic compound. This method is particularly suitable for the preparation of compounds in which $R_1$ and $R_2$ represent hydrogen atoms or alkyl groups, the acetylene used being a compound of formula $R_1.C{\equiv}C.R_2$.

Compounds of Formula II used as starting materials for the above-described processes according to the invention are conveniently prepared from the corresponding amines of formula

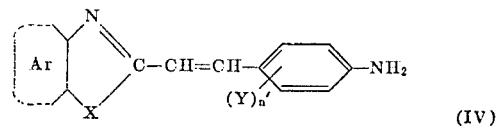

(wherein Ar, X, Y and $n'$ are as hereinbefore defined) by known methods e.g. as described in "Chemistry of Carbon Compounds," Editor E. H. Rodd, published by Elsevier, vol. IIIA, page 309. The compounds of Formula IV can themselves be prepared in any convenient manner, for example as described in British patent specification No. 996,240 and Belgian patent specification No. 623,386.

The following examples, in which all parts are by weight, illustrate the invention.

Example 1

2-(p-aminostyryl)-5-methylbenzoxazole (6.5 pts.) is dissolved in hot acetone (80 pts.) and then cooled to 0° C. and a mixture of water (90 pts.) and concentrated hydrochloric acid (13 pts.) added with stirring. Sodium nitrite (2 pts.) dissolved in water (7.5 pts.) is then added and the mixture stirred for ¾ hr. whilst maintaining the temperature between 3–5° C. The excess sodium nitrite is then removed by addition of a small amount of sulphamic acid. A further amount of concentrated hydrochloric acid (33 pts.) is added to the mixture, which is then cooled to 0° C. Sodium azide (2 pts.) dissolved in water (20 pts.) is added slowly and the mixture stirred at room temperature for 2 hrs. The mixture is then diluted with water (200 pts.), stirred for another ½ hr., filtered and the precipitate washed first with cold water and then with cold methanol to give 6 pts. of 2-(p-azidostyryl)-5-methylbenzoxazole.

Sodium (1 pt.) is dissolved in ethanol (60 pts.) and cooled to room temperature. Ethyl acetoacetate (6 pts.) is added and the mixture stirred well. 2-(p-azidostyryl)-5-methyl-benzoxazole (6 pts.), prepared as described above are then added. After addition of a further quantity of ethanol (160 pts.), the mixture is slowly brought to the boil and refluxed for about ½ hr., cooled and filtered. The precipitate is washed with cold alcohol and recrystallised from toluene. The compound 2-[4'-(4''-ethoxycarbonyl - 5'' - methyl-1'':2'':3''-triazol-(1'')-yl)styryl]-5-methylbenzoxazole obtained has a M.P.=216–217° C.

*Micro-analysis.*—Found: C, 68.7; H, 5.1; N, 15.0. Theory: C, 68.0; H, 5.2; N, 14.4.

The ethyl ester thus obtained on hydrolysis with alcoholic caustic soda and recrystallisation from acetic acid gives 2- [4' - (4''-carboxy-5''-methyl-1'':2'':3''-triazol- (1'') - yl)styryl]-5-methylbenzoxazole, M.P.=220–221° C. (dec.).

The free carboxylic acid on heating to 230–245° C. for ½ hr. decarboxylates to give a product 2-[4'-(5''-methyl - 1'':2'':3'' - triazol-(1'')-yl)styryl]-5-methylbenzoxazole which on recrystallisation from acetone has a M.P.=193–195° C.

Example 2

Sodium (1.5 pts.) is dissolved in ethanol (240 pts.), cooled to room temperature and ethyl acetoacetate (9 pts.) is added. The mixture is stirred well and 2-(p-azidostyryl) benzthiazole (9.8 pts.) added slowly. The reaction mixture is brought to the boil and refluxed for ½ hr., cooled to room temperature, filtered and washed with cold alcohol. The product 2-[4'-(4''-ethoxycarbonyl-5''-methyl - 1'':2'':3''-triazol-(1'')-yl)styryl]-benzthiazole, is recrystallised from toluene, M.P.=216-217° C. This compound is hydrolysed as in Example 1 to give the corresponding free carboxylic acid, M.P. (dec.)=217-218° C.

The 2-(p-azidostyryl)-benzthiazole used in this example is prepared from 2-(p-aminostyryl)-benzthiazole in a manner analogous to that described in Example 1 for the preparation of the corresponding benzoxazole starting material.

Example 3

Sodium (1.5 pts.) is dissolved in ethanol (120 pts.). Ethyl acetoacetate (15 pts.) is then added followed by 2-(p-azidostyryl)-5-methoxy-benzimidazole with stirring. The mixture is heated to the boil and refluxed for ½ hr. It is then cooled, filtered and washed with ethanol. The product, 2 - [4' - (4" - ethanoxycarbonyl - 5" - methyl-1":2":3" - triazol - (1)-yl)styryl]-5-methoxybenzimidazole, is recrystallised from ethanol, M.P.=236-238° C. The corresponding free carboxylic acid is obtained by hydrolysis (as in Example 1), M.P. (dec.)=270-272° C.

The preparation of 2-(p-azidostyryl)-5-methoxybenzimidazole used in this example is analogous to that of the 2-(p-azidostyryl)-benzoxazole described in Example 1.

Example 4

Sodium (1 pt.) is dissolved in alcohol (200 pts.), cooled to room temperature and ethyl acetoacetate (10 pts.) added followed by 2-(p-azidostyryl)-naphtho(1:2d) triazole (7 pts.). The mixture is stirred well, heated to the boil, refluxed for ½ hr., cooled, filtered and the precipitate washed with water. The product, 2-[4'-(4"-ethoxycarbonyl - 5" - methyl - 1":2":3" - triazol-(1)-yl) styryl]-naphtho(1:2d)-triazole, is crystallised from chlorobenzene, M.P.=240-241° C.

The corresponding free carboxylic acid is obtained by hydrolysis as in Example 1 with alcoholic caustic soda, M.P. (dec.)=230-231° C.

Example 5

Sodium (1.5 pts.) is dissolved in ethanol (120 pts.), and ethyl acetoacetate (15 pts.) is added followed by 2-(4-azidostyryl)-5-methyl-benzimidazole (11 pts.). The mixture is stirred well and heated to the boil, refluxed for ½ hr., cooled and filtered. The precipitate is then washed first with ethanol and then with water. The product 2 - [4' - (4" - ethoxycarbonyl-5"-methyl-1":2":3"-triazol-(1)-yl)styryl]-5-methylbenzimidazole, is recrystallised from butanol, M.P.=255-256° C.

The corresponding free carboxylic acid is obtained by hydrolysis as in Example 1 with alcoholic caustic soda, M.P. (dec.)=270-272° C.

The following table lists the compounds according to the invention which have been prepared in the above Examples 1 to 5, and also further compounds which have been prepared by analogous methods.

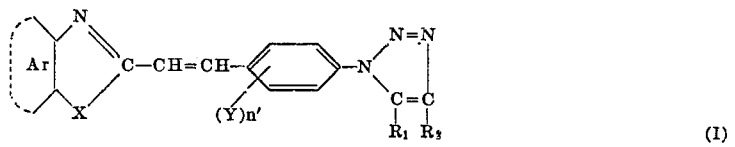

(I)

TABLE

| Ar | X | Y | n' | R₁ | R₂ | E₁¹ | λmax. | M. Pt., °C. | Solution fluoresces |
|---|---|---|---|---|---|---|---|---|---|
| CH₃-⌬ | —O— | — | 0 | CH₃ | —COO.C₂H₅ | 936 | 332 | 216-7 | Violet blue. |
| CH₃-⌬ | —O— | — | 0 | CH₃ | —COOH | 880 | 332 | 220 (decomp.) | Do. |
| CH₃-⌬ | —O— | — | 0 | CH₃ | H | 1,180 | 332 | 193-5 | Do. |
| ⌬ | —S— | — | 0 | CH₃ | —COO.C₂H₅ | 968 | 342 | 216-7 | Do. |
| ⌬ | —S— | — | 0 | CH₃ | —COOH | 1,147 | 342 | 218 (decomp.) | Do. |
| ⌬ | —S— | — | 0 | CH₃ | H | 1,364 | 342 | 182-4 | Do. |
| CH₃O-⌬ | —NH— | — | 0 | CH₃ | —COO.C₂H₅ | 941 | 358 | 231-3 | Blue. |
| CH₃O-⌬ | —NH— | — | 0 | CH₃ | —COOH | 859 | 359 | 255 (decomp.) | Do. |

TABLE
| Ar | X | Y | n' | R₁ | R₂ | $E_1^1$ | $\lambda_{max}$ | M. Pt., °C. | Solution fluoresces |
|---|---|---|---|---|---|---|---|---|---|
| 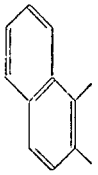 | —O— | — | 0 | $CH_3$ | $—COO.C_2H_5$ | 890 | 355 | 236 | Violet blue |
| 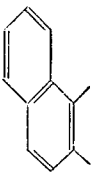 | —O— | — | 0 | $CH_3$ | —COOH | 964 | 355 | 226 (decomp.) | Do. |
| 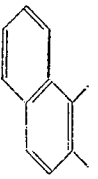 | —O— | — | 0 | $CH_3$ | H | 1,024 | 355 | 202-3 | Do. |
|  | —NH— | — | 0 | $CH_3$ | $—COO.C_2H_5$ | 1,164 | 347 | 248-9 | Do. |
|  | —NH— | — | 0 | $CH_3$ | —COOH | 1,126 | 345 | 270-2 (decomp.) | Do. |
|  | —O— | — | 0 | $CH_3$ | $—COO.C_2H_5$ | 762 | 343 | 207-8 | Blue |
|  | —O— | — | 0 | $CH_3$ | —COOH | 812 | 344 | 220 (decomp.) | Do. |
|  | —O— | — | 0 | $CH_3$ | H | 918 | 344 | 208-9 | Do. |
| 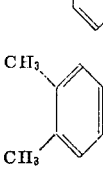 | —NH— | — | 0 | $CH_3$ | $—COO.C_2H_5$ | 2,016 | 351 | 277-279 (decomp.) | Do. |
| 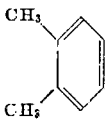 | —NH— | — | 0 | $CH_3$ | —COOH | 2,085 | 352 | 282-5 (decomp.) | Do. |
|  | —NH— | — | 0 | H | $—CH_2OH$ | 1,136 | 349 | 298-300 (decomp.) | Violet blue |
|  | —NH— | o-Cl | 1 | H | $—CH_2OH$ | 1,020 | 358 | 282-4 | Do. |

TABLE

| Ar | X | Y | n' | R₁ | R₂ | $E_1^1$ | $\lambda_{max}$ | M. Pt., °C. | Solution fluoresces |
|---|---|---|---|---|---|---|---|---|---|
| CH₃-[phenyl]- | —NH— | o-Cl | 1 | H | —CH₂OCOCH₃ | 854 | 357 | 223-5 | Do. |
| CH₃-[phenyl]- | —NH— | o-Cl | 1 | OH | —CH₂CH₂OH | 1,200 | 350 | >300 | Do. |
| CH₃-[phenyl]- | —NH— | — | 0 | H | —C(OH)(CH₃)—CH₂CH₃ | 1,136 | 354 | 247-9 (decomp.) | Do. |
| CH₃-[phenyl]- | —O— | o-Cl | 1 | H | —CH₂OH | 972 | 340 | 222-5 | Do. |
| CH₃-[phenyl]- | —O— | o-Cl | 1 | OH | —CH₂CH₂OH | 920 | 338 | 213-4 | Do. |
| CH₃-[phenyl]- | —O— | — | 0 | H | —CH₂OH | 1,236 | 336 | 212-5 | Do. |
| CH₃-[phenyl]- | —NH— | o-CN | 1 | H | —CH₂OH | 1,034 | 363 | 246-50 | Blue. |
| CH₃-[phenyl]- | —NH— | — | 0 | H | H | 1,444 | 350 | 249-9 | Violet blue. |
| CH₃O-[phenyl]- | —O— | o-Cl | 1 | H | —CH₂OH | 740 | 349 | 206-8 | Greenish blue. |
| (CH₃)₂-[phenyl]- | —NH— | o-Cl | 1 | H | —CH₂OH | 890 | 359 | 285-7 (decomp.) | Blue. |
| [naphthyl] | —NH— | o-Cl | 1 | H | —CH₂OH | 1,132 | 342 | 267-9 | Violet blue. |
| [naphthyl] | —N(CH₂CH₂OH)— | o-Cl | 1 | H | —CH₂OH | 1,140 | 342 | 273-5 (decomp.) | Do. |

EXAMPLE 6

An aqueous bath is prepared containing 0.2 gm./litre of 2-[4' - (4" - ethoxycarbonyl - 5"-methyl-1":2":3"-triazol-(1")-yl)styryl]-5-methylbenzoxazole.

In use, nylon fabric is treated in the bath for half-an-hour at 40° C., the liquor ratio being 1:40. The nylon thus treated is subsequently rinsed and dried and is then much whiter than prior to the treatment. Similar results are obtained from treating cotton fabric in the same way.

I claim:
1. A compound of the formula

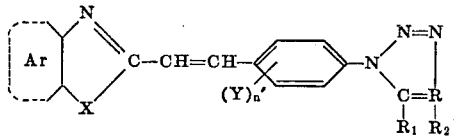

in which Ar represents the residue of an aromatic carbocyclic ring system; X is selected from the group consisting of oxygen and sulphur atoms, and a group of Formula —NR— wherein R represents a hydrogen atom, an alkyl group containing from 1 to 4 carbon atoms; $R_1$ and $R_2$, which may be the same or different, are each selected from the group consisting of a hydrogen atom, an alkyl group containing from 1 to 4 carbon atoms, an alkyl group containing from 1 to 4 carbon atoms substituted by a hydroxy group or an acyloxy group, a carboxy group, a hydroxy group and an alkoxy-carbonyl group containing from 2 to 5 carbon atoms; Y is selected from the group consisting of a halogen atom, a cyano group, and alkyl and alkoxy groups containing from 1 to 4 carbon atoms and $n'$ is 0 or an integer from 1 to 4.

2. A compound as claimed in claim 1 in which Ar represents a group of formula

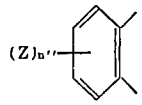

in which Z is selected from the group consisting of a halogen atom and alkyl and alkoxy groups containing from 1 to 4 carbon atoms and $n''$ is 0 or an integer from 1 to 4.

3. A compound as claimed in claim 1 in which X represents —NR— wherein R represents a hydroxyalkyl group containing from 1 to 4 carbon atoms.

4. A compound as claimed in claim 1 in which at least one of $R_1$ and $R_2$ represents hydroxymethyl or β-hydroxyethyl.

5. A compound as claimed in claim 1 in which at least one of $R_1$ and $R_2$ represents an acetoxyalkyl group.

6. A compound as claimed in claim 1 which is 2-[4'-(4''-hydroxymethyl-1'':2'':3''-triazol - 1'' - yl)styryl] - 5-methylbenzimidazole.

7. A compound as claimed in claim 1 which is 2-[2'-chloro-4'-(4''-hydroxymethyl - 1'':2'':3'' - triazol-1''-yl)-styryl]-5-methylbenzimidazole.

8. A compound as claimed in claim 1 which is 2-[2'-chloro-4'-(4''-hydroxymethyl - 1'':2'':3'' - triazol - 1''yl)-styryl]-5-methylbenzoxazole.

9. A compound as claimed in claim 1 which is 2-[2'-chloro-4'-(4''-hydroxymethyl - 1'':2'':3'' - triazol-1''-yl)-styryl]-benzimidazole.

References Cited

UNITED STATES PATENTS

| | | | |
|---|---|---|---|
| 2,901,476 | 8/1959 | Gold et al. | 260—240 |
| 3,401,048 | 9/1968 | Okubo et al. | 260—240.9 XR |

OTHER REFERENCES

Oliveri-Mandala, Memorie della R. accademia Nazionale aci Lincei, Series 6, vol. 2, pages 132 and 147 (1926).

Benson et al., Chemical Reviews, vol. 46, pages 1, 5, 8 to 12, 24, 29 to 31 and 36 (1950).

Netherlands Published application No. 6,515,601, 12 pages, published June 9, 1966.

Chemical Abstracts, vol. 54, col. 2064 (1960) (abstract of Belgian Patent 570,732).

JOHN D. RANDOLPH, Primary Examiner

U.S. Cl. X.R.

117—33.5; 252—102, 117, 152, 301.2